(12) United States Patent
Chen et al.

(10) Patent No.: US 11,004,616 B2
(45) Date of Patent: May 11, 2021

(54) LOW LEAKAGE ELECTROLYTIC CAPACITOR

(71) Applicant: APAQ TECHNOLOGY CO., LTD., Miaoli County (TW)

(72) Inventors: Ming-Tsung Chen, Changhua County (TW); Chung-Jui Su, Kaohsiung (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 187 days.

(21) Appl. No.: 16/203,996

(22) Filed: Nov. 29, 2018

(65) Prior Publication Data

US 2019/0096589 A1  Mar. 28, 2019

Related U.S. Application Data

(63) Continuation-in-part of application No. 15/402,355, filed on Jan. 10, 2017, now abandoned.

(30) Foreign Application Priority Data

Dec. 12, 2016  (TW) .................................. 105141051

(51) Int. Cl.
  *H01G 9/15*  (2006.01)
  *H01G 9/028*  (2006.01)
  *H01G 9/145*  (2006.01)
  *H01G 9/10*  (2006.01)

(52) U.S. Cl.
  CPC ............. *H01G 9/151* (2013.01); *H01G 9/028* (2013.01); *H01G 9/145* (2013.01); *H01G 9/10* (2013.01)

(58) Field of Classification Search
  CPC ........... H01G 9/15; H01G 9/145; H01G 9/058
  See application file for complete search history.

(56) References Cited

U.S. PATENT DOCUMENTS

2004/0095708 A1 * 5/2004 Takeda .................. H01G 9/145
                                                                361/504

FOREIGN PATENT DOCUMENTS

| CN | 102169757 A | 8/2011 |
|---|---|---|
| CN | 102169758 A | 8/2011 |
| CN | 102723202 A | 10/2012 |
| CN | 105261484 A | 1/2016 |
| CN | 105609309 A | 5/2016 |
| JP | 2008262991 A | 10/2008 |

* cited by examiner

*Primary Examiner* — Eric W Thomas
(74) *Attorney, Agent, or Firm* — Li & Cai Intellectual Property (USA) Office

(57) ABSTRACT

A low leakage electrolytic capacitor includes a winding-type capacitor element, a hybrid electrically conductive medium and a package body. The winding-type capacitor element includes an anode foil, a cathode foil, and a separator interposed between the anode foil and the cathode foil. The hybrid electrically conductive medium is impregnated in the winding-type capacitor element and includes an electrically conductive polymer, an auxiliary polymer, an ion liquid, and a carbon filler. The package body encloses the winding-type capacitor element and the hybrid electrically conductive medium.

14 Claims, 4 Drawing Sheets

LOW LEAKAGE ELECTROLYTIC CAPACITOR

CROSS-REFERENCE TO RELATED PATENT APPLICATION

This application claims the benefit of priority to Taiwan Patent Application No. 105141051, filed on Dec. 12, 2016. The entire content of the above identified application is incorporated herein by reference.

This application is a continuation-in-part of U.S. application Ser. No. 15/402,355, filed on 10 Jan. 2017 and entitled "LOW LEAKAGE ELECTROLYTIC CAPACITOR", now pending. The entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The instant disclosure relates to an electrolytic capacitor, and more particularly to a low leakage electrolytic capacitor having excellent properties required by both solid and liquid electrolytic capacitors.

BACKGROUND OF THE DISCLOSURE

It is well known that the basic function of the capacitor is charging and discharging. The capacitor is mainly used to provide bypassing, coupling, filtering, oscillation, or transforming function. Various applications of the capacitor include home appliances, computer motherboards and peripherals, power supplies, communication products and automobiles.

Electrolytic capacitors are categorized into two different types, i.e., solid electrolytic capacitors and liquid electrolytic capacitors. A solid electrolytic capacitor mainly uses a conductive layer as the electrolyte, and a liquid electrolytic capacitor mainly uses an electrolyte solution as the electrolyte. The solid electrolytic capacitor, compared to the liquid electrolytic capacitor, has a relatively low equivalent series resistance (ESR), but its conductive layer cannot be densely formed on surfaces of a porous anode foil, and thus may be peeled off. In addition, its conductive layer is usually relatively thick after being repeatedly applied with a chemical oxidation process to reduce ESR. However, the process may result in damage to the dielectric film. Since the solid electrolytic capacitor lacks a damage repairing mechanism, a short circuit may occur due to an increased leakage current.

SUMMARY OF THE DISCLOSURE

One aspect of the instant disclosure relates to a low leakage electrolytic capacitor having the advantages required by the solid electrolytic capacitor and a reduced leakage current.

One of the embodiments of the instant disclosure provides a low leakage electrolytic capacitor including a winding-type capacitor element, a hybrid electrically conductive medium and a package body. The winding-type capacitor element includes an anode foil, a cathode foil, and a separator interposed between the anode foil and the cathode foil. The hybrid electrically conductive medium is impregnated in the winding-type capacitor element and includes an electrically conductive polymer, an auxiliary polymer, an ion liquid, and a carbon filler. The auxiliary polymer includes at least one monomer selected from the group consisting of formulas (I)-(IV):

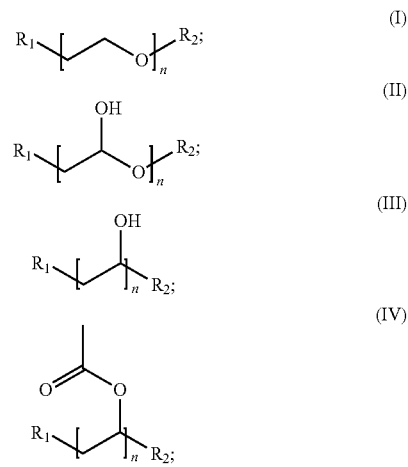

wherein $R_1$ and $R_2$ each independently represent a hydrogen, methyl, ethyl, propyl, butyl, hydroxyl, methyl epoxy, or methacrylate group, and n is an integer between 2 and 10. The package body encloses the winding-type capacitor element and the hybrid electrically conductive medium.

One of the advantages of the instant disclosure is that the low leakage electrolytic capacitor, in which the hybrid electrically conductive medium includes an electrically conductive polymer, an auxiliary polymer, an ion liquid, and a carbon filler, has good electrical and mechanical properties. Specifically speaking, the ion liquid has high thermal stability, high electrical conductivity and good electrochemical properties and can be operable over a wide temperature range, so that it, serving as a dispersion medium, can be used to replace solvents. The electrically conductive polymer can be uniformly and stably dispersed in the ion liquid in the form of particles, so as to increase the transfer of electrons and ions. Furthermore, the auxiliary polymer is helpful to the uniform arrangement of the electrically conductive polymer and the ion liquid, and the carbon filler can provide more electrically conductive pathways between the particles of the electrically conductive polymer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

The instant disclosure provides a hybrid electrically conductive medium which can serve as a solid electrolyte or an electrically conductive layer for use in an electrolytic capacitor. The hybrid electrically conductive medium, in which an electrically conductive polymer and a carbon filler are uniformly dispersed in an ion liquid, can facilitate the transfer of electrons and ions. Furthermore, the hybrid electrically conductive medium has the functions of hole-filling, defect repairing, and reducing leakage current.

Embodiments of a low leakage electrolytic capacitor according to the instant disclosure are described herein. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

First Embodiment

Figure 1:
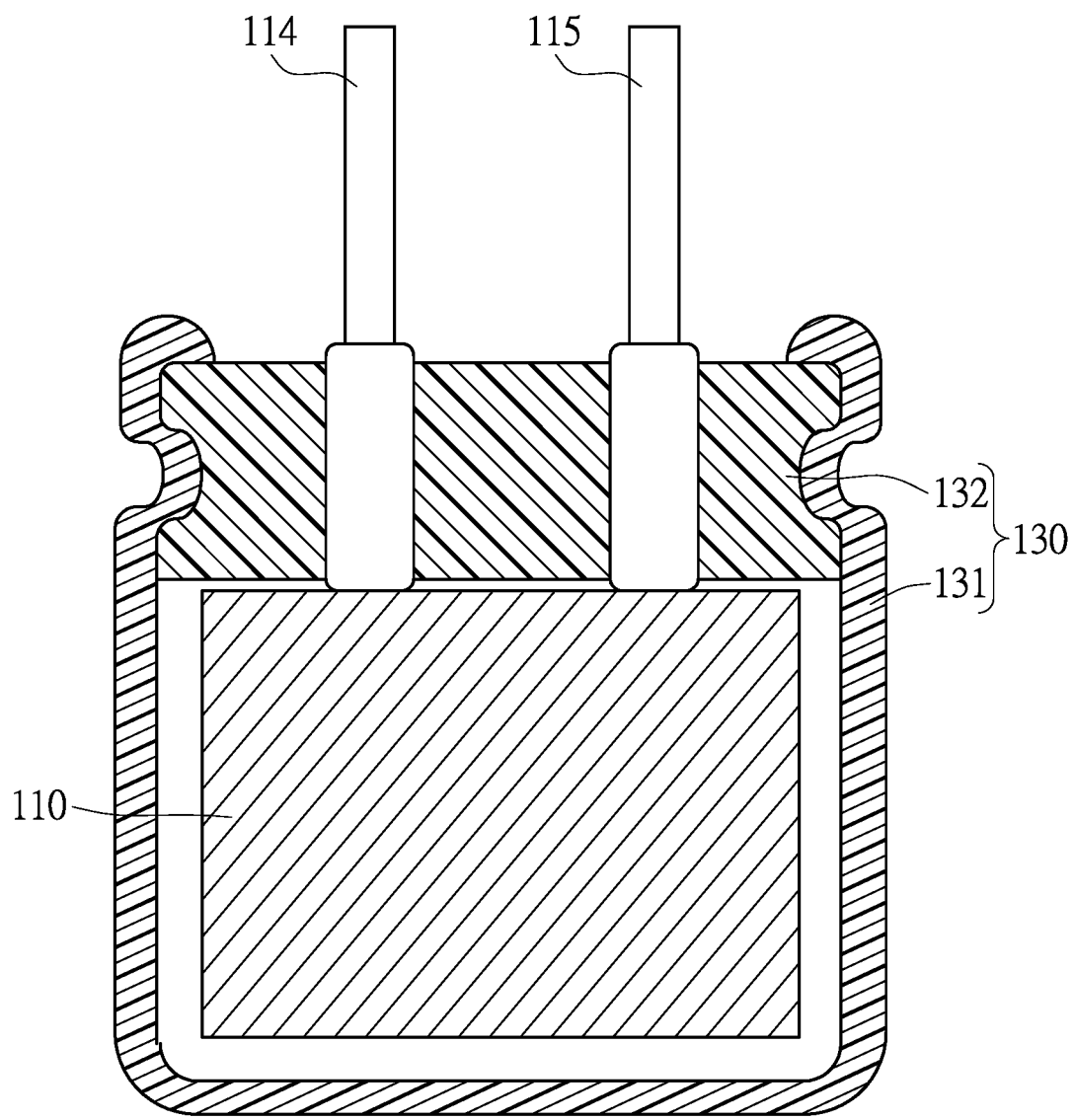
FIG. 1 is a cross-sectional view of a low leakage electrolytic capacitor according to the first embodiment of the instant disclosure.
Figure 2:
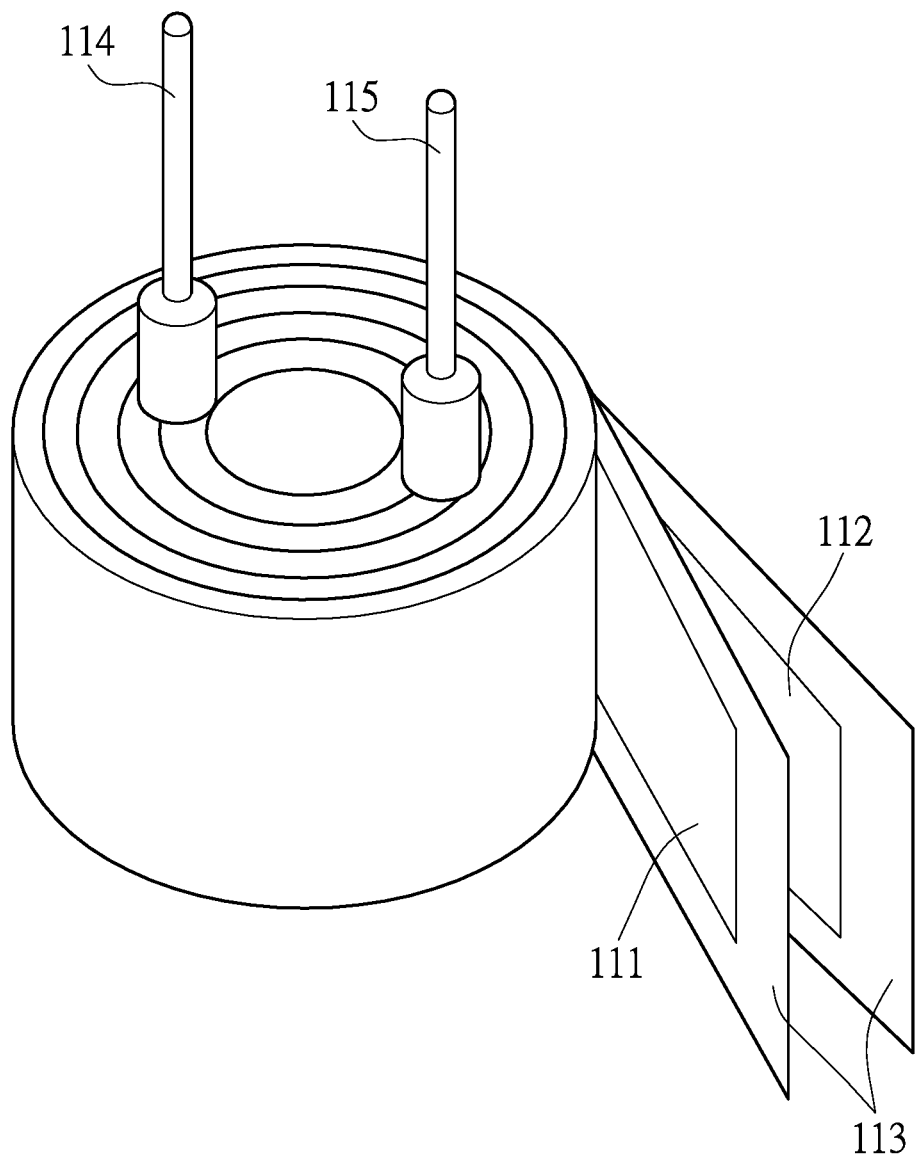
FIG. 2 is a perspective view of a winding-type capacitor element of the low leakage electrolytic capacitor.
Figure 3:
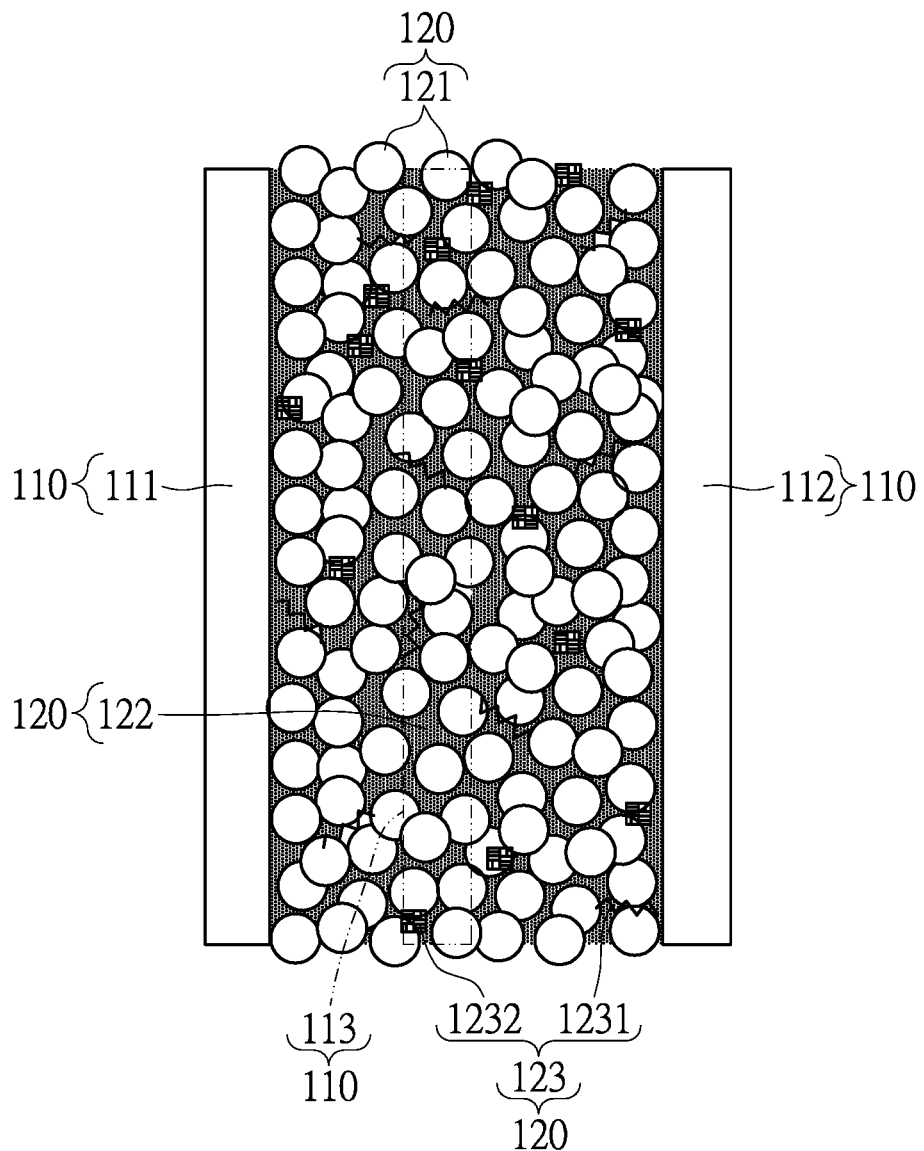
FIG. 3 is a schematic view showing a hybrid electrically conductive medium impregnated in the winding-type capacitor element.

Referring to FIG. 1 to FIG. 3, the low leakage electrolytic capacitor 100 of this embodiment includes a winding-type capacitor element 110, a hybrid electrically conductive medium 120, and a package body 130. The winding-type capacitor element 110 includes an anode foil 111, a cathode foil 112, and a separator 113 interposed between the anode foil 111 and the cathode foil 112. The hybrid electrically conductive medium 120 is impregnated in the winding-type capacitor element 110. The package body 130 encloses the winding-type capacitor element 110 and the hybrid electrically conductive medium 120.

More specifically, the anode foil 111 is provided with an anode lead 114 and the cathode foil 112 is provided with a cathode lead 115. The anode foil 111 and the cathode foil 112 can be wound into a cylindrical shape with the separator 113 being interposed therebetween, and fixed together by an adhesive tape (not shown). In the present embodiment, the anode foil 111 and the cathode foil 112 can be made of a valve metal (e.g. aluminum, tantalum, niobium, or titanium). Preferably, the cathode foil 112 is a titanium foil having excellent corrosion resistance, so as to prevent the capacitor from open circuit, thereby increasing reliability.

Furthermore, the anode foil 111 and the cathode foil 112 each can be formed with a porous surface layer (not shown) by a corrosion treatment and a dielectric film (not shown) by a chemical oxidation process. The porous surface layer can have a predetermined pore configuration formed by a corrosion treatment with or without a voltage supply, so as to meet the capacitance requirements. The dielectric film can have a predetermined thickness by controlling oxidation conditions.

The separator 113 can be a porous membrane made of cellulose, kraft paper, polyethylene (PE), polypropylene (PP), Teflon®, polyethylene terephthalate (PET), polybutylene terephthalate (PBT), polyphenylene sulfide (PPS), polyimide (PI), polyalkylenimine (PAI), polyethylenimine (PEI), or rayon, but the instant disclosure is not limited thereto. In the case where short circuit failure does not occur, the density and thickness of the separator 113 can be reduced as much as possible so as to reduce the impedance.

As shown in FIG. 3, the hybrid electrically conductive medium 120 includes an electrically conductive polymer 121, an ion liquid 122, a carbon filler 123, and an auxiliary polymer (not shown). It should be noted that the ion liquid 122 has high thermal stability, high electrical conductivity and good electrochemical properties and can be operable over a wide temperature range between −96° C. and 400° C., so that it, serving as a dispersion medium, can be used to replace solvents. The electrically conductive polymer 121 can be uniformly and stably dispersed in the ion liquid 122 in the form of particles, so as to increase the transfer of electronic and ionic conductivity. The carbon filler 123 can provide more electrically conductive pathways between the particles of the electrically conductive polymer 121, and improve the electrical and mechanical properties of the capacitor. The auxiliary polymer is helpful to the uniform arrangement of the electrically conductive polymer 121 and the ion liquid 122.

Specific examples of the electrically conductive polymer 121 include dioxythiophene doped with polystyrene-sulfonic acid (PEDOT:PSS), polythiophene (PT), polyacetylene (PA), polyaniline (PANI), and polypyrrole (PPy). It should be noted that the aforesaid polymers all have high electrical conductivity, excellent heat resistance and temperature properties, and strong affinity for adhesion to the dielectric layer without damaging it, and would not deteriorate under an applied voltage. Therefore, the aforesaid polymers are suitable for use in a capacitor electrolyte.

The ion liquid includes at least one cationic species selected from the group consisting of pyrazinium cation as shown in formula (1), pyrizinium cation as shown in formula (2), piperzinium cation as shown in formula (3), pyrrolizinium cation as shown in formula (4), ammonium cation as shown in formula (5), phosponium cation as shown in formula (6), benzothiazolium cation as shown in formula (7), isoquinoline cation as shown in formula (8), and thiazoluim cation as shown in formula (9).

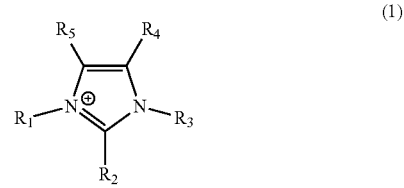

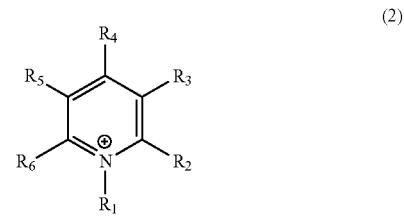

-continued

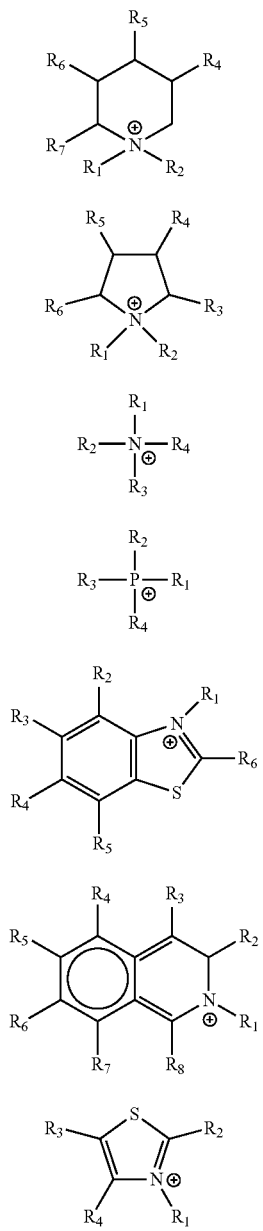

In formulas (1)-(9), R1 to R8 each independently represent a hydrogen atom, substituted or unsubstituted C1-C10 alkyl group, unsubstituted or substituted C1-C10 alkenyl group, unsubstituted or substituted C1-C10 alkynyl group, substituted or unsubstituted aryl group, substituted or unsubstituted heteroaryl group, acyl group, ester group, ether group, or amino group.

The ion liquid includes at least one anionic species selected from the group consisting of tetrafluoroborate anion as shown in formula (10), hexafluorophosphate anion as shown in formula (11), mesylate anion as shown in formula (12), trifluoro-methanesulfonate anion as shown in formula (13), dicyandiamide anion as shown in formula (14), an anion as shown in formula (15), tosylate anion as shown in formula (16), an compound containing phosphonate ester as shown in formula (17).

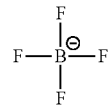

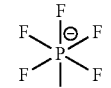

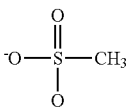

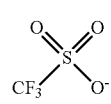

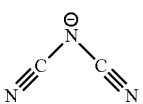

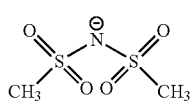

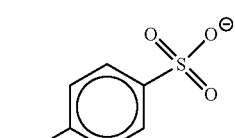

In formula (17), R1 and R2 each independently represent a hydrogen atom, substituted or unsubstituted C1-C10 alkyl group, unsubstituted or substituted C1-C10 alkenyl group, unsubstituted or substituted C1-C10 alkynyl group, substituted or unsubstituted aryl group, substituted or unsubstituted heteroaryl group, acyl group, ester group, ether group, or amino group.

As used herein, the term "ionic liquid" generally refers to a polymer that is a liquid at a temperature of about 200° C. or less, in some embodiments about 150° C. or less, in some embodiments about 100° C. or less, and in some embodiments, from about 10° C. to about 60° C. By "liquid" it is meant that the polymer may have a discernible melting point (based on DSC analysis) or simply be flowable at the indicated temperature. For example, a flowable polymer may exhibit a viscosity of less than about 10,000 mPas at the indicated temperature. Thus, the liquid state of an ionic liquid is meant to encompass all of these embodiments, including the molten state and the flowable state.

As used herein, the term "heteroaryl" generally refers to a substituted or unsubstituted aromatic group of 1 to 14 carbon atoms and 1 to 6 heteroatoms selected from oxygen, nitrogen, sulfur, and phosphorous, and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquindin-3-yl). Examples of heteroaryl groups include pyridyl, furanyl, thienyl, thiazolyl, isothiazolyl, triazolyl, imidazolyl, imidazolinyl, oxazolyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl. The heteroaryl groups may optionally be substituted with from 1 to 8 or in some embodiments 1 to 5, or 1 to 3, or 1 to 2 substituents.

The carbon filler 123 can include carbon nanotubes and graphene, but is not limited thereto. The auxiliary polymer includes at least one monomer selected from ethylene glycol monomer as shown in formula (I), glycerol monomer as shown in formula (II), vinyl alcohol monomer as shown in formula (III), and vinyl acetate monomer as shown in formula (IV).

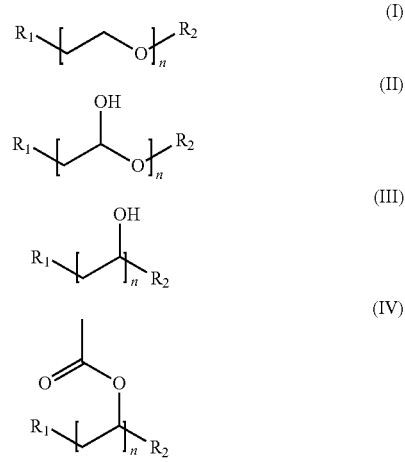

In formulas (I)-(IV), R1 and R2 each independently represent a hydrogen, methyl, ethyl, propyl, butyl, hydroxyl, methyl epoxy, or methacrylate group, and n is an Integer between 2 and 10. It should be noted that oxygen containing functional group(s) of the auxiliary polymer can facilitate the arrangement of the ion liquid and the electrically conductive polymer by a similar function of hydrogen bond, so as to increase the overall electrical conductivity and stability.

The hybrid electrically conductive medium 120 can further include a lower volatility solvent for increasing thermal stability and electrical conductivity. The lower volatility solvent includes one or a combination of polyalkylene glycol or a derivative thereof, polyethylene glycol or a derivative thereof, polypropylene glycol or a derivative thereof, polytetramethylene glycol or a derivative thereof, a copolymer of ethylene glycol and propylene glycol, a copolymer of ethylene glycol and butylene glycol, and a copolymer of polypropylene glycol and butylene glycol.

It should be noted that the ingredients of the hybrid electrically conductive medium 120 are present in a predetermined weight ratio. Accordingly, the hybrid electrically conductive medium 120 has the functions of hole-filling, defect repairing, and reducing leakage current, and is configured to fill the empty spaces of the winding-type capacitor element 110. More specifically, the electrically conductive polymer 121 is present in an amount from 1 to 20 wt %, preferably from 2 to 8 wt %, based on the total weight of the hybrid electrically conductive medium 120. The ion liquid 122 is present in an amount from 0.05 to 30 wt %, preferably from 0.05 to 5 wt %, based on the total weight of the hybrid electrically conductive medium 120. The carbon filler 123 is present in an amount from 0 to 5 wt %, preferably from 0.05 to 3 wt %, based on the total weight of the hybrid electrically conductive medium 120. The auxiliary polymer is present in an amount from 0.1 to 5 wt %, preferably from 0.5 to 3 wt %, based on the total weight of the hybrid electrically conductive medium 120. The lower volatility solvent is present in an amount from 0.5 to 50 wt %, preferably from 3 to 10 wt %, based on the total weight of the hybrid electrically conductive medium 120.

In the present embodiment, the cationic species and the anionic species can be mixed in either different ratios or the same ratio to form an ionic compound. The precursor of the cationic species can be a compound having halogen ions. The precursor of the anionic species can be a compound having alkali metal or alkaline earth metal ions. In practice, the precursors of the cationic species and the anionic species are mixed to form an ion liquid, wherein the molar ratio of the anionic species to the cationic species is from 0.9 to 2, and the residual ion concentration of alkali metal or alkaline earth metal ions is between 10 to 10000 ppm. Accordingly, the overall electrical conductivity can be increased.

The package body 130 includes a casing 131 and a sealing cap 132 for sealing the casing 131. More specifically, the casing 131 (e.g., aluminum casing) is configured to accommodate the winding-type capacitor element 110. That is, the winding-type capacitor element 110 is housed in the casing 131. The sealing cap 132 is fixed to an opening of the casing 131 to block moisture, dust or other impurities, so as to ensure the normal operation of the winding-type capacitor element 110. The sealing cap 132 can be made of a resilient material such as rubber or plastic, and provided with a pair of through holes (not numbered) to expose a portion of the anode and cathode leads 114, 115 for electrical connection.

Second Embodiment

Figure 4:
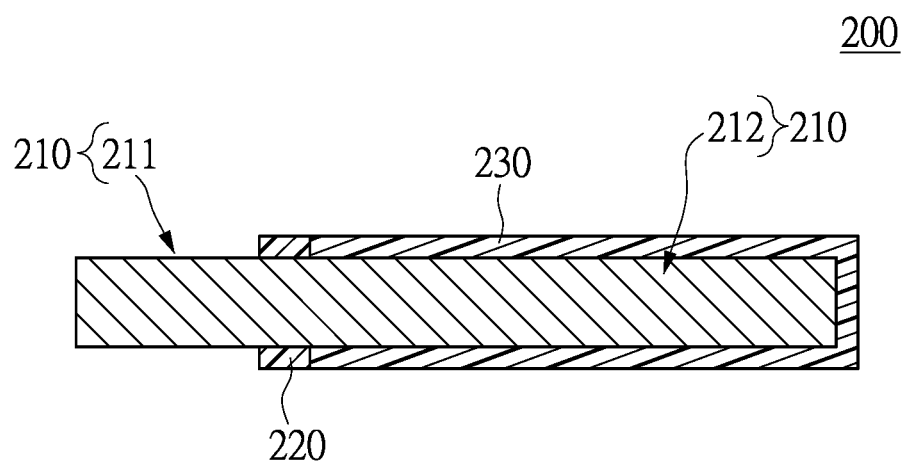
FIG. 4 is a cross-sectional view of a low leakage electrolytic capacitor according to the second embodiment of the instant disclosure.

Referring to FIG. 4, the low leakage electrolytic capacitor 200 of this embodiment includes a substrate layer 210, an insulating layer 220, and a conductive layer 230. The insulating layer 220 surrounds a portion of the substrate layer 210 to define an anode part 211 and a cathode part 212 apart from each other, and the electrically conductive layer 230 covers the surface of the cathode part 212.

More specifically, the substrate layer 210 can be made of a valve metal (e.g. aluminum, tantalum, niobium, or titanium). To increase the capacitor performance, the anode part 211 and the cathode part 212 each can be formed with a porous surface layer (not shown) by a corrosion treatment and a dielectric film (not shown) by a chemical oxidation process. The composition of the conductive layer 230 includes an electrically conductive polymer, an auxiliary polymer, an ion liquid, and a carbon filler. Specific examples of these ingredients are described in the first embodiment, and will not be reiterated herein. The thickness of the conductive layer 230 can be between 50 μm and 500 μm, preferably 80 μm and 200 μm. It should be noted that the conductive layer 230, in which the electrically conductive polymer and the carbon filler can be uniformly dispersed by the auxiliary polymer and the ion liquid, can be densely formed on the surface of the cathode part 212 to repair surface defects, thereby increasing the capacitor reliability.

One of the advantages of the instant disclosure is that the low leakage electrolytic capacitor, in which the hybrid electrically conductive medium includes an electrically conductive polymer, an auxiliary polymer, an ion liquid, and a carbon filler, has good electrical properties as shown in Table 1 and mechanical properties. Furthermore, the low leakage electrolytic capacitor has excellent stability and capacitance when undergoing a high speed charging/discharging cycle, and the functions of hole-filling, defect repairing, and reducing leakage current. Specifically speaking, the ion liquid has high thermal stability, high electrical conductivity and good electrochemical properties and can be operable over a wide temperature range, so that it, serving as a dispersion medium, can be used to replace solvents. The electrically conductive polymer can be uniformly and stably dispersed in the ion liquid in the form of particles, so as to increase the transfer of electrons and ions. Furthermore, the auxiliary polymer is helpful to the uniform arrangement of the electrically conductive polymer and the ion liquid, and the carbon filler can provide more electrically conductive pathways between the particles of the electrically conductive polymer.

TABLE 1

|  | Composition of electrolyte | Cap (μF) | ESR (mΩ) |
|---|---|---|---|
| Comparative example | Conventional electrolyte | 48.2 | 15.1 |
| Example 1 | Electrically conductive polymer: PEDOT:PSS<br>Auxiliary polymer of formula (I)<br>Carbon filler:<br>CNT and graphene | 48.4 | 14.7 |
| Example 2 | Electrically conductive polymer: PEDOT:PSS<br>Auxiliary polymer of formula (II)<br>Carbon filler:<br>CNT and graphene | 47.8 | 15.7 |
| Example 3 | Electrically conductive polymer: PEDOT:PSS<br>Auxiliary polymer of formula (III)<br>Carbon filler:<br>CNT and graphene | 49.2 | 13.8 |
| Example 4 | Electrically conductive polymer: PEDOT:PSS<br>Auxiliary polymer of formula (IV)<br>Carbon filler:<br>CNT and graphene | 49.7 | 13.5 |
| Example 5 | Electrically conductive polymer: PEDOT:PSS<br>Auxiliary polymer of formula (I)<br>Ion liquid including an cationic specie of formula (1) and anionic specie of formula (10)<br>carbon filler:<br>CNT and graphene | 47.7 | 16.1 |
| Example 6 | PEDOT:PSS<br>Auxiliary polymer of formula (I)<br>Ion liquid including an cationic specie of formula (1) and anionic specie of formula (12)<br>carbon filler:<br>CNT and graphene | 48.8 | 14.2 |
| Example 7 | PEDOT:PSS<br>Auxiliary polymer of formula (I) | 49.1 | 13.9 |
| Example 8 | Ion liquid including an cationic specie of formula (2) and anionic specie of formula (10)<br>carbon filler:<br>CNT and graphene<br>PEDOT:PSS<br>Auxiliary polymer of formula (I)<br>Ion liquid including an cationic specie of formula (2) and anionic specie of formula (14)<br>carbon filler:<br>CNT and graphene | 49.9 | 13.5 |

In addition, the conductive layer, in which the electrically conductive polymer and the carbon filler can be uniformly dispersed by the auxiliary polymer and the ion liquid, can be densely formed on the surface of the cathode part to repair surface defects, thereby increasing the capacitor reliability.

Based on the above, the low leakage electrolytic capacitor according to the embodiments of the instant disclosure has excellent properties required by both solid and liquid electrolytic capacitors.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A low leakage electrolytic capacitor, comprising::
   a winding-type capacitor element including an anode foil, a cathode foil, and a separator interposed between the anode foil and the cathode foil
   a hybrid electrically conductive medium formed in the winding-type capacitor element and including an electrically conductive polymer, an auxiliary polymer, an ion liquid, and a carbon filler, wherein the auxiliary polymer includes at least one of monomers represented by formulae (I) and (II):

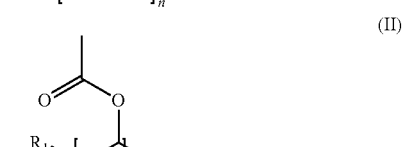

wherein $R_1$ and $R_2$ each independently represent a hydrogen, methyl, ethyl, propyl, butyl, hydroxyl, methyl epoxy, or methacrylate group, and n is an integer between 2 and 10; and
   a package body enclosing the winding-type capacitor element and the hybrid electrically conductive medium.

2. The low leakage electrolytic capacitor of claim 1, wherein an amount of the auxiliary polymer is 0.1 to 5 wt % of a total weight of the hybrid electrically conductive medium.

3. The low leakage electrolytic capacitor of claim 1, wherein the electrically conductive polymer is polyethylene dioxythiophene doped with polystyrene sulfonic acid (PEDOT:PSS), polythiophene (PT), polyacetylene (PA), polyaniline (PANI), or polypyrrole (PPy).

4. The low leakage electrolytic capacitor of claim 3, wherein an amount of the electrically conductive polymer is 1 to 20 wt % of a total weight of the hybrid electrically conductive medium.

5. The low leakage electrolytic capacitor of claim 1, wherein the ion liquid includes at least one of cationic species represented by formulae (1)-(9) and at least one of anionic species represented by formulae (10)-(17):

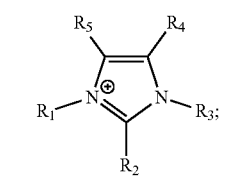 (1)

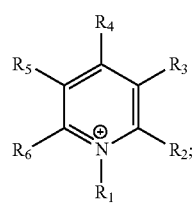 (2)

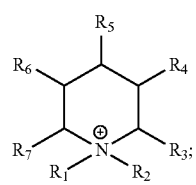 (3)

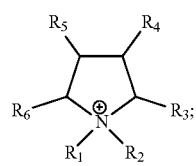 (4)

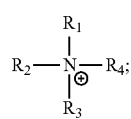 (5)

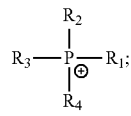 (6)

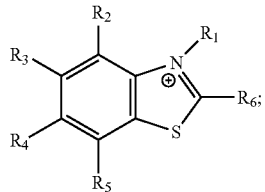 (7)

-continued

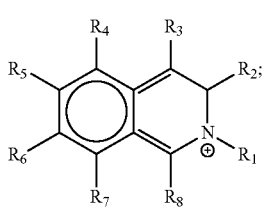 (8)

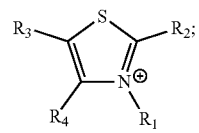 (9)

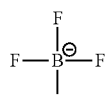 (10)

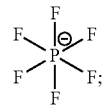 (11)

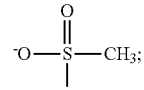 (12)

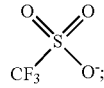 (13)

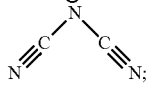 (14)

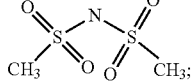 (15)

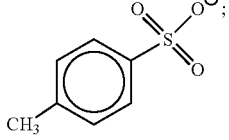 (16)

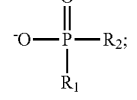 (17)

wherein $R_1$ to $R_8$ each independently represent a hydrogen atom, substituted or unsubstituted C1-C10 alkyl group, unsubstituted or substituted C1-C10 alkenyl group, unsubstituted or substituted C1-C10 alkynyl group, substituted or unsubstituted aryl group, substituted or unsubstituted heteroaryl group, acyl group, ester group, ether group, or amino group.

6. The low leakage electrolytic capacitor of claim 5, wherein an amount of the ion liquid is 0.05 to 30 wt % of a total weight of the hybrid electrically conductive medium.

7. The low leakage electrolytic capacitor of claim 5, wherein the electrically conductive polymer is polyethylene dioxythiophene doped with polystyrene sulfonic acid (PEDOT:PSS), the auxiliary polymer is formed of the monomer of formula (I), the ion liquid includes the cationic specie of formula (1) and the anionic specie of formula (12), the carbon filler includes carbon nanotubes and graphene, and in formula (I), $R_1$ and $R_2$ each independently represent a methyl epoxy group.

8. The low leakage electrolytic capacitor of claim 5, wherein the electrically conductive polymer is polyethylene dioxythiophene doped with polystyrene sulfonic acid (PEDOT:PSS), the auxiliary polymer is formed of the monomer of formula (II), the ion liquid includes the cationic specie of formula (2) and the anionic specie of formula (14), the carbon filler includes carbon nanotubes and graphene, and in formula (II), $R_1$ and $R_2$ each independently represent a methacrylate group.

9. The low leakage electrolytic capacitor of claim 1, wherein the carbon filler includes carbon nanotubes and graphene.

10. The low leakage electrolytic capacitor of claim 9, wherein an amount of the carbon filler is 0.05 to 3 wt % of a total weight of the hybrid electrically conductive medium.

11. The low leakage electrolytic capacitor of claim 1, wherein the hybrid electrically conductive medium further includes a lower volatility solvent which includes one or a combination of polyalkylene glycol or a derivative thereof, polyethylene glycol or a derivative thereof, polypropylene glycol or a derivative thereof, polytetramethylene glycol or a derivative thereof, a copolymer of ethylene glycol and propylene glycol, a copolymer of ethylene glycol and butylene glycol, and a copolymer of polypropylene glycol and butylene glycol.

12. The low leakage electrolytic capacitor of claim 11, wherein an amount of the lower volatility solvent is about 0.05 to about 50 wt % of a total weight of the hybrid electrically conductive medium.

13. The low leakage electrolytic capacitor of claim 1, wherein the electrically conductive polymer is polyethylene dioxythiophene doped with polystyrene sulfonic acid (PEDOT:PSS), the auxiliary polymer is formed of the monomer of formula (I), the carbon filler includes carbon nanotubes and graphene, and in formula (I), $R_1$ and $R_2$ each independently represent a methyl epoxy group.

14. The low leakage electrolytic capacitor of claim 1, wherein the electrically conductive polymer is polyethylene dioxythiophene doped with polystyrene sulfonic acid (PEDOT:PSS), the auxiliary polymer is formed of the monomer of formula (II), the carbon filler includes carbon nanotubes and graphene, and in formula (II), $R_1$ and $R_2$ each independently represent a methacrylate group.

* * * * *